Figure 1:
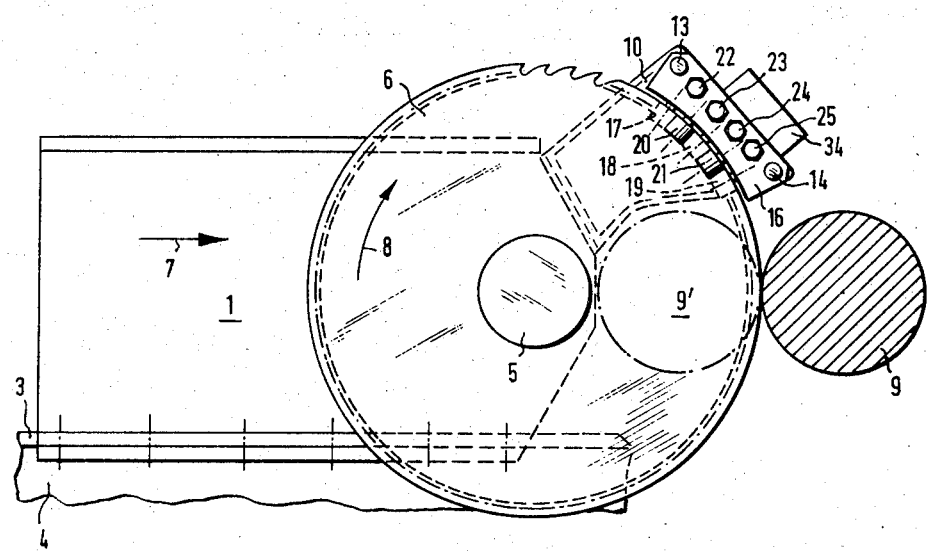

United States Patent [19]
Orendi

[11] 3,828,642
[45] Aug. 13, 1974

[54] CIRCULAR SAW
[75] Inventor: Roderich Orendi, Reutlingen-Sondelfingen, Germany
[73] Assignee: Gustav Wagner Machinenfabrik, Reutlingen, Germany
[22] Filed: Feb. 26, 1973
[21] Appl. No.: 335,898

[30] Foreign Application Priority Data
Mar. 1, 1972  Germany............................ 2209711

[52] U.S. Cl......................... 83/823, 83/824, 83/828
[51] Int. Cl............................................. B23d 47/02
[58] Field of Search ............ 83/821, 824, 827, 829, 83/828, 825, 823; 30/389

[56] References Cited
UNITED STATES PATENTS
15,304   7/1856   Rice...................................... 83/828
114,235   4/1871   Washburn............................. 83/824

FOREIGN PATENTS OR APPLICATIONS
70,233   9/1930   Sweden................................ 30/389
826,231   12/1951   Germany ............................ 83/824
799,052   3/1936   France................................. 83/821

Primary Examiner—Donald R. Schran
Attorney, Agent, or Firm—Wolfgang G. Fasse; Willard W. Roberts

[57] ABSTRACT

The present circular saw includes rollers for guiding the saw blade, preferably at its periphery when it enters into a workpiece. The guide rollers are attached to a pair of roller carrier members so that a gap is formed between opposing guide rollers through which the saw blade passes. The roller carrier members are spring biased relative to a support and toward the saw blade. Preferably the biasing is such that the saw blade is bend outwardly slightly away from a saw housing.

7 Claims, 2 Drawing Figures

PATENTED AUG 13 1974  3,828,642

CIRCULAR SAW

BACKGROUND OF THE INVENTION

The present invention relates to a circular saw, especially for cold sawing of metal workpieces by means of a circular saw blade for cutting steel and non-ferrous metals.

The portion of a rotating circular saw blade which is located between the saw blade drive shaft and the workpiece is subjected to a buckling load, especially when the workpiece is clamped in a vice and the sawing apparatus is advanced toward the workpiece. Due to this buckling action it is necessary to provide each saw blade of a given diameter with a predetermined thickness which is such that the saw blade will not buckle as a result of the feed advance force to which the saw blade is exposed.

The costs for a cutting operation by means of a saw are defined as expense per surface area of the cut surface. These costs involve an item which takes up the main proportion of the total costs. This item involves the costs of the material removed or milled off by the sawing operation. For example, it has been observed that by using a circular saw blade of hard high speed tool steel, the relevant cost items per area unit of the saw cut relate to each other about as follows: tool costs: material costs: machinery costs as 1 : 16 : 5. Where a circular saw blade is used having teeth faced with hard metal alloy tips, the above ratio is about as follows: 12 : 16 : 3.

In view of the above, costs can be substantially reduced if it would be possible to reduce the quantity of material milled off by the saw blade. This means that the thickness of the circular saw blade would have to be reduced. However, a thin circular saw is substantially more subject to buckling than a thick saw blade of the same diameter.

OBJECTS OF THE INVENTION

In view of the foregoing, it is the aim of the invention to achieve the following objects singly or in combination:
 to reduce the costs for a cut by means of a sawing operation, especially a so called cold sawing operation by means of a circular saw blade, especially for steel and non-ferrous metals;
 to increase the buckling resistance of circular saw blades; and
 to provide guide means for the rotating saw blade which support the saw blade near its circumferential edge adjacent an area where the saw blade engages the workpiece.

SUMMARY OF THE INVENTION

According to the invention there is provided a circular saw, especially a circular cold saw for steel and non-ferrous metals wherein the circular saw blade, which is preferably removably attached to a drive shaft, is supported adjacent to its circumference immediately ahead of the entry of the saw blade into the workpiece whereby the support of the saw blade corresponds substantially to the situation of a beam, one end of which is rigidly supported and the other end of which is freely guided, as will be explained in more detail below. The guiding of the saw blade as taught by the invention has the advantage that the buckling resistance of the saw blade is increased which in effect means that the thickness of the saw blade may be reduced to one half the thickness of prior art saw blades while simultaneously maintaining the same buckling resistance as prior art saw blades which are twice as thick as the saw blades which may be used according to the invention. This feature in turn has the advantage that the material milled off by the saw blade has been substantially reduced.

According to a preferred embodiment, the saw blade is guided by means of rollers arranged on both sides of the saw blade and which are pressed against both sides of the saw blade. Preferably, the saw blade guide rollers are supported by roller carrier members which in turn are carried by two guide rods secured to a support block. The support block is, for example, attached to the housing means of the saw and the guide rods extend perpendicularly relative to the plane defined by the saw blade. The guide rods extend across the circumference of the saw blade whereby the carrier members are positioned on either side of the saw blade just ahead or upstream of the point defined by the size of the largest workpiece to be handled by the saw and as viewed in the direction of rotation of the saw blade.

According to the invention, the guide roller carrier members are in turn guided on the above mentioned guide rods. The carrier members support the guide rollers in such a manner that the rotational axis of these guide rollers point toward the rotational axis of the saw blade drive shaft in such a manner that the generatrix of the rollers extend substantially in parallel to the side surfaces of the saw blade whereby the rollers of one roller carrier roll along one side surface of the saw blade whereas the rollers supported by the other roller carrier roll along the opposite side surface of the saw blade. Spring means are provided for pressing the first roller carrier which is arranged adjacent to the saw blade surface facing the saw housing, against the surface of the saw blade. The stiffness of these spring means is selected so that the saw blade is pressed slightly away from the saw blade housing. Further, the just mentioned roller carrier between the saw blade and the support means is preferably provided with a support mass. Preferably, the other roller carrier member on the opposite side of the saw blade is also pressed by spring means toward the saw blade so that the rollers supported by the other roller carrier are firmly pressed against the opposite surface of the saw blade. It has been found to be advantageous that the guide rollers ride along the teeth zone of the saw blade, for example, when a saw blade with segmented teeth is used.

BRIEF FIGURE DESCRIPTION

Figure 2:
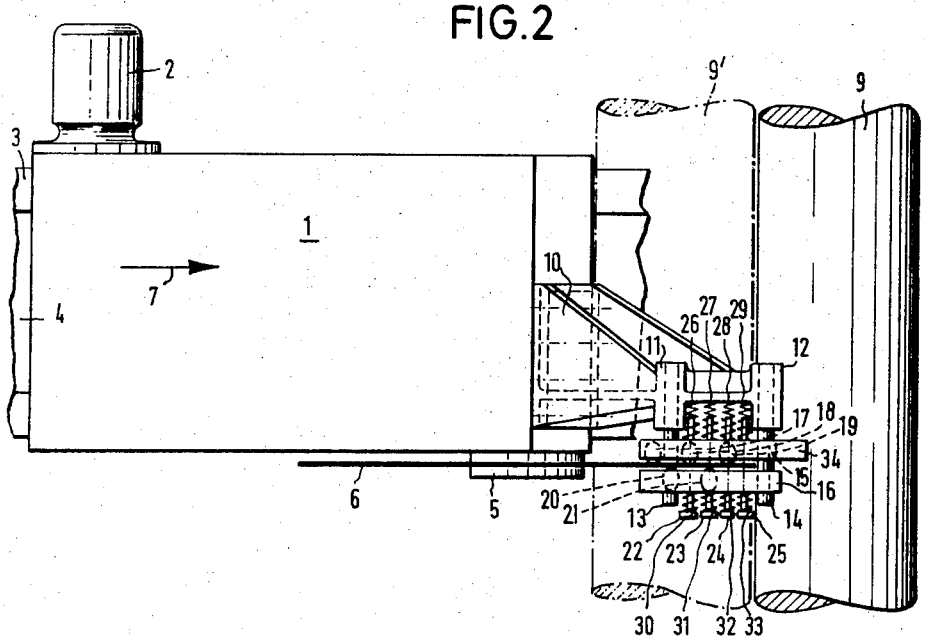

In order that the invention may be clearly understood, it will now be described, by way of example, with reference to the accompanying drawings, wherein:

FIG. 1 is a somewhat schematic side view of a saw according to the invention and illustrating the saw housing which may be constructed as a saw carriage gliding back and forth on a bench or table; and FIG. 2 is a top view onto the embodiment according to FIG. 1.

DESCRIPTION OF EXAMPLE EMBODIMENTS

The saw housing or slide carriage 1 carries a motor 2 and slides along flat guide rails 3 of the machine bench 4. The housing 1 further carries the drive shaft 5 for the circular saw blade 6. The circular saw blade 6 is releasably secured to the shaft 5. The arrow 7 indicates the feed advance direction of the housing 1. The arrow 8 indicates the rotational direction of the saw blade 6. The workpiece 9, for example, a round rod is clamped or chucked in a clamping device not shown. The dash-dotted illustration 9' indicates the position of the workpiece when the cut is completed. The saw housing 1 is initially so positioned relative to the workpiece 9 that the saw blade 9 just about touches workpiece 9 prior to the sawing operation.

A supporting buck 10 is secured to the front side of the saw housing 1, for example, by means of screws not shown. Mounting bushings 11 and 12 shown in FIG. 2 are provided at the upper end of the supporting buck 10. Respective guide rods 13 and 14 are securely held in these mounting bushings 11 and 12. According to the invention, there are provided two guide roller carriers 15 and 16. These guide roller carriers are provided with holes for receiving in a slidable manner the guide rods 13 and 14 whereby the position of the guide roller carriers 15 and 16 may be adjusted along the guide rods relative to the saw blade 6. The carrier members 15 and 16 are provided with roller supporting studs or pins 35. These pins extend radially toward the longitudinal axis of the saw blade drive shaft 5 and carry respective guide rollers. Thus, the roller carrier member 15 carries the three guide rollers 17, 18 and 19 shown in dashed lines in FIG. 1 so as to indicate their position behind the saw blade, that is, adjacent to the saw blade side facing away from the viewer. The roller carrier 16 supports, for example, two rollers 20 and 21, arranged to contact the facing side of the saw blade. Preferably, the rollers 20 and 21 are positioned opposite the spacings between the rollers 17, 18 and 19. As mentioned, the rotational axes of all the journal pins 35 point toward the axis of the shaft 5.

A plurality of guide bolts, for example four guide bolts 22, 23, 24 and 25, extend freely through the roller carrier member 16 so that the latter is movable relative to these bolts. However, these guide bolts are rigidly secured to the roller carrier 15, for example, by means of a threaded connection. These bolts 22, 23, 24 and 25 have first free ends facing toward the support buck 10 and second free ends extending away from the carrier member 16. To assure a rigid connection between the guide bolts and the carrier member 15, counter nuts may be provided adjacent to said first mentioned free ends. These counter nuts are not shown for simplicity's sake. All of the free ends have preferably a smooth surface for properly guiding spring means, such as coiled compression springs 26, 27, 28 and 29, located on the first mentioned free ends between carrier member 15 and the supporting buck 10. Further spring means, such as coiled compression springs 30, 31, 32 and 33 are arranged on the second free ends between the carrier member 16 and the heads or shoulders provided at the second free ends.

The compression springs 26 to 29 tend to push the roller carrier member 15 away from the supporting buck 10 and toward the saw blade 6 whereby the rollers 17, 18 and 19 are pressed against the respective surface of the circular saw blade 6. Preferably, the stiffness of the springs 26 to 29 is such that the saw blade is slightly bent away from the housing 1.

The coiled compression springs 30 to 33 rest with their outer ends against the screw heads or shoulders and thus press the roller carrier member 16 toward the saw blade 6 whereby the two rollers 20 and 22 are pressed against the respective surface of the saw blade 6, that is, the surface facing away from the support buck 10. Incidentally, the roller carrier member 15 is provided with a support mass 34.

The above mentioned important advantage of the invention, namely, that the saw blades used according to the invention may have a thickness corresponding to about one half of the thickness of prior art saw blades while simultaneously retaining the same buckling resistance as prior art saw blades, is supported by the following considerations. First, it may be assumed that the circular saw blade of a cold saw which is rigidly secured to the saw drive shaft corresponds, at least at the beginning of the cutting operation, to the first buckling load example according to Euler because the saw blade is freely movable at its circumference. Accordingly, it is justified to compare the portion of the circular saw blade which is subjected to the load, with a rod, one end of which is rigidly clamped and the other end of which is freely movable whereby the rod is subjected to a buckling force $K1$. According to the first buckling load example of Euler, the buckling force is defined as follows:

$$K_1 = \frac{1}{4} \cdot (\pi^2 . E.J./r^2)$$

wherein $E$ corresponds to Young's modulus, whereas $J$ represents the moment of inertia and wherein $r$ corresponds to the radius of the saw blade and thus to the length l of the rod.

Second, let it be assumed that the thickness of the circular saw blade is reduced to one half of the thickness of the saw blade assumed in the first consideration in order to reduce the material milled off by the saw blade. The thickness of the saw blade enters into the moment of inertia $J$ with the power of three. Therefore, the resulting buckling force $K2$ would correspond to:

$$K_2 = \frac{1}{8} K_1.$$

Stated differently, by reducing the thickness of the saw blade to one half of the original thickness, the thinner saw blade can take up a buckling force which is only ⅛ of the actual feed advance force.

Third, the buckling load example according to Euler is considered wherein the rod is rigidly secured at one end whereas the opposite end of the rod is movably guided. For this example, Euler provides the equation for the buckling force $K3$ as follows:

$$K_3 = 2 \cdot (\pi^2 . E . J/r2) = 8 K_1.$$

In this instance, the buckling force $K3$ is equal to eight times the buckling force $K1$.

Fourth, the foregoing considerations are applied according to the invention to the saw blade according to the second assumption, namely, a saw blade with a thickness corresponding to one half of the original thickness. Now the buckling force $K2,3$ may be calculated as follows:

$$K_{2:3} = \frac{1}{8} \cdot 8 K_1 = K_1.$$

Surprisingly, the saw blade, the free end of which is freely guided, may withstand buckling forces corresponding to the buckling forces of the first assumption although the guided saw blade is only half as thick as the saw blade of the first assumption.

Although the invention has been described with reference to specific example embodiments, it is to be understood, that it is to be intended to cover all modifications and equivalents within the scope of the appendend claims.

What is claimed is:

1. A circular saw especially for cold sawing workpieces of metal, by means of a circular power driven saw blade comprising housing means, shaft means with a longitudinal axis for rotatably supporting said saw blade relative to said housing, saw blade guide means arranged for guiding at least a circumferential portion of said saw blade, and support means for said saw blade guide means arranged to hold the guide means in such a position relative to the saw blade that the saw blade is guided for engaging a workpiece, said saw blade guide means comprising guide roller means and carrier means including two carrier members for said guide means, and means for movably attaching said carrier means to said support means, said attaching means including at least two guide rods secured to said support, said carrier members having guide holes through which the guide rods slidably extend, said guide rods extending across the periphery of the saw blade for locating one carrier member between the support means and the saw blade and the other carrier member on the opposite side of the saw blade, and spring means comprising coiled compression springs and guide bolts for said coiled compression springs, said guide bolts extending freely through said other carrier member whereby the other carrier member is movable relative to the guide bolts, said guide bolts being rigidly secured to said one carrier member but extending with first free ends through said one carrier member toward said support means, said guide bolts having further free ends extending through the other carrier member, said further free ends including spring retaining means, said coiled compression springs being located on said free ends of the respective guide bolts between the one carrier member and the support means on one side of the saw blade and between the other carrier member and the retaining means on the other side of the saw blade whereby the carrier members and the respective guide roller means are pressed against opposite sides of the saw blade and independently of each other.

2. The circular saw according to claim 1, wherein said support means for said guide means comprise bracket means, means for securing said bracket means to said housing, said guide rods being secured to said bracket means to extend across the saw blade outside its circumference, said guide rods holding said saw blade guide means in a position for cooperation with said saw blade.

3. The circular saw according to claim 2, wherein said two carrier members are movably held by said guide rod means in such a manner that one carrier member is held on each side of the saw blade and slidable relative to the saw blade.

4. The circular saw according to claim 1, wherein said carrier members comprise journal pins for said guide roller means, said journal pins extending radially toward said longitudinal axis of the saw blade shaft, said journal pins carrying two spaced guide rollers on one side of the saw blade and three guide rollers with spacings therebetween on the opposite side of the saw blade, whereby the two rollers are arranged opposite the spacings between the three rollers.

5. The circular saw according to claim 4, wherein one of said two carrier members is provided with a support mass.

6. A circular saw for cold sawing workpieces especially workpieces of metal, by means of a circular power driven saw blade, comprising housing means, a shaft having a longitudinal axis for rotatably supporting said saw blade relative to said housing means, means for releasably securing said saw blade to said shaft, guide roller means for guiding said saw blade, roller support means for said guide roller means, means for securing said roller support means to said housing means, said roller support means including a first roller carrier arranged adjacent to the side of the saw blade facing said housing means, and a second roller carrier arranged adjacent to the opposite side of the saw blade, and spring means for biasing one of said roller carriers toward said saw blade, said spring means being sufficiently strong to slightly bend the saw blade away from said housing means, wherein said first and second roller carriers comprise journal pins for said guide roller means, said journal pins extending radially toward said longitudinal axis of the saw blade shaft, said journal pins carrying two spaced guide rollers on one side of the saw blade and three guide rollers with spacings therebetween on the opposite side of the saw blade, whereby the two rollers are arranged opposite the spacings between the three rollers.

7. The circular saw according to claim 6, comprising further spring means for biasing the other roller carrier toward said saw blade, said further spring means being less stiff than said spring means for biasing said one roller carrier whereby said saw blade is slightly bent away from said housing means.

* * * * *